(12) United States Patent
Kuo et al.

(10) Patent No.: US 10,082,881 B2
(45) Date of Patent: Sep. 25, 2018

(54) NAVIGATION KEYPAD

(71) Applicant: Wistron Corporation, New Taipei (TW)

(72) Inventors: Yu-Ling Kuo, New Taipei (TW); Ko-Wei Huang, New Taipei (TW)

(73) Assignee: WISTRON CORPORATION, New Taipei (TW)

( * ) Notice: Subject to any disclaimer, the term of this patent is extended or adjusted under 35 U.S.C. 154(b) by 289 days.

(21) Appl. No.: 14/980,121

(22) Filed: Dec. 28, 2015

(65) Prior Publication Data

US 2016/0334887 A1   Nov. 17, 2016

(30) Foreign Application Priority Data

May 12, 2015 (TW) .............................. 104115126 A (51) Int. Cl.
| | |
|---|---|
| *G06F 3/0354* | (2013.01) |
| *G06F 3/02* | (2006.01) |
| *G06F 1/16* | (2006.01) |

(52) U.S. Cl.
CPC ............ *G06F 3/0205* (2013.01); *G06F 1/169* (2013.01)

(58) Field of Classification Search
CPC .............................. G06F 3/0354; G06F 3/0202
USPC .................................................. 345/156–184
See application file for complete search history.

(56) References Cited

U.S. PATENT DOCUMENTS

| | | | | |
|---|---|---|---|---|
| 5,498,843 | A * | 3/1996 | Date .................... | G06F 3/033 200/5 A |
| 5,621,196 | A * | 4/1997 | Nishijima ............ | H01H 25/041 200/4 |
| 5,902,972 | A * | 5/1999 | Nestor ................. | H01H 23/003 200/1 B |
| 6,635,832 | B1 | 10/2003 | Oster et al. | |

(Continued)

FOREIGN PATENT DOCUMENTS

| | | |
|---|---|---|
| CN | 1181516 C | 12/2004 |
| CN | 2710130 Y | 7/2005 |

(Continued)

OTHER PUBLICATIONS

Office Action issued in corresponding Taiwan patent application dated Sep. 19, 2016 and its English translation.

*Primary Examiner* — Carolyn R Edwards
(74) *Attorney, Agent, or Firm* — McClure, Qualey & Rodack, LLP (57) ABSTRACT

A navigation keypad is disposed in an electronic device including a case and a keypad printed circuit board disposed in the case. The navigation keypad includes an elastic support element and a body. The elastic post includes an elastic post, and a first end of the elastic post has an inclined plane. The body is passing through the case and corresponding to the elastic support element. The body includes a direction keypad portion lean against the elastic post and providing a reload force. The direction keypad portions may be formed on the body for direction control. Therefore, the number of the components and the assembling hour of the navigation keypad can be reduced. In addition, the inclined plane allows the direction keypad portion to be closely in contact with the directional elastic post. Therefore, when one direction keypad portion is pressed, other direction keypad portion would not be affected.

14 Claims, 8 Drawing Sheets

(56) References Cited

U.S. PATENT DOCUMENTS

| | | | |
|---|---|---|---|
| 8,614,667 B2* | 12/2013 | McAlindon | G06F 3/0213 |
| | | | 345/156 |
| 8,994,666 B2* | 3/2015 | Karpfinger | G06F 3/0202 |
| | | | 345/173 |
| 2003/0085793 A1 | 5/2003 | Inoue et al. | |
| 2005/0007341 A1 | 1/2005 | Inoue et al. | |
| 2008/0238879 A1* | 10/2008 | Jaeger | G06F 3/03545 |
| | | | 345/173 |
| 2014/0224631 A1* | 8/2014 | Hanaoka | H01Q 23/00 |
| | | | 200/341 |

FOREIGN PATENT DOCUMENTS

| | | |
|---|---|---|
| CN | 201319706 Y | 9/2009 |
| CN | 201498417 U | 6/2010 |
| CN | 101789320 A | 7/2010 |
| TW | 568339 | 12/2003 |
| TW | M1254719 | 1/2005 |
| TW | I362603 B | 4/2012 |

\* cited by examiner

NAVIGATION KEYPAD

CROSS-REFERENCES TO RELATED APPLICATIONS

This non-provisional application claims priority under 35 U.S.C. § 119(a) on Patent Application No. 104115126 filed in Taiwan, R.O.C. on 2015 May 12, the entire contents of which are hereby incorporated by reference.

BACKGROUND

Technical Field

The instant disclosure relates to a navigation keypad, in particular, to a navigation keypad for users to control or operate an electronic device.

Related Art

Figure 1:
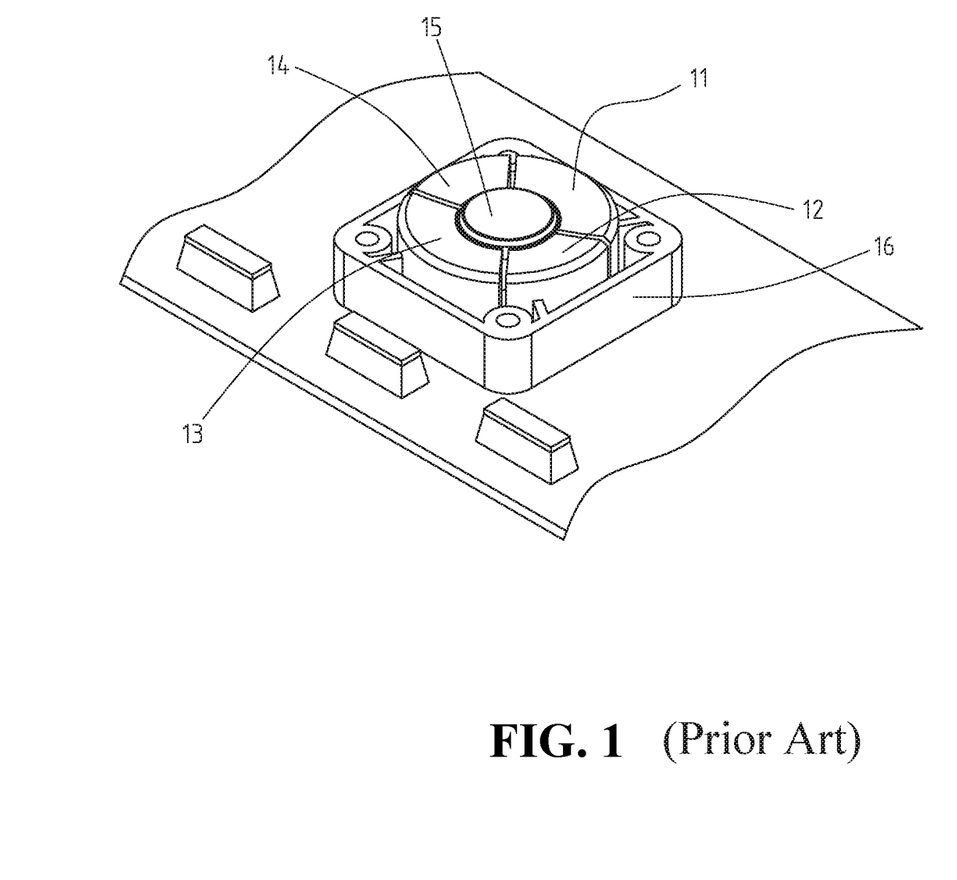
FIG. 1 is a perspective view of a traditional direction keypad assembly.

Up, down, left, or right direction keys are usually provided on phones or remote controls for tuning volume of the sounds or for switching between channels. As shown in FIG. 1, a traditional direction keypad assembly may be designated to include four individual and separated control keypads 11, 12, 13, 14 and a center keypad 15 for confirmation. These keypads are fastened and positioned via a support base 16. The traditional direction keypad assembly allows each of the keypads to be operated individually which means the pressing of one keypad would not affect other keypads. However, the traditional direction keypad assembly has too many components to be assembled quickly and conveniently. In addition, the cost of the traditional direction keypad assembly is high.

SUMMARY

To address the above issues, one embodiment of the instant disclosure provided a navigation keypad adapted to be disposed in an electronic device. The electronic device comprises a case and a keypad printed circuit board disposed in the case. The navigation keypad comprises an elastic support element and a body. The elastic support element is received in the case and disposed on the keypad printed circuit board. The elastic support element comprises at least one elastic post. The elastic post has a first end distant from the keypad printed circuit board and a second end near the keypad printed circuit board, and the first end has an inclined plane. The body is passing through the case of the electronic device and positioned corresponding to the elastic support element. The body comprises at least one direction keypad portion lean against the elastic post.

Another embodiment of the instant disclosure provides a navigation keypad adapted to be disposed in an electronic device. The electronic device comprises a case and a keypad printed circuit board disposed in the case. The navigation keypad comprises an elastic support element and a body. The elastic support element is received in the case and disposed on the keypad printed circuit board. The elastic support element comprises four elastic posts. The body is passing through the case of the electronic device and positioned corresponding to the elastic support element. The body comprises four direction keypad portions. Each of the direction keypad portions is lean against the corresponding elastic post and provides a reload force for the corresponding elastic post.

Yet another embodiment of the instant disclosure provides a navigation keypad adapted to be disposed in an electronic device. The electronic device comprises a case and a keypad printed circuit board disposed in the case. The navigation keypad comprises an elastic support element and a body. The elastic support element is received in the case and disposed on the keypad printed circuit board. The elastic support element comprises a center elastic post and a four directional elastic posts around the center elastic post. The body is passing through the case of the electronic device and positioned corresponding to the elastic support element. The body comprises a center keypad portion and four direction keypad portions. The center keypad portion is corresponding to the center elastic post. The direction keypad portions are corresponding to the directional elastic posts, respectively. The center keypad portion and the direction keypad portions are connected with each other through a connecting member, and the connecting member defines a cavity.

Based on this, instead of providing several direction control keypads individually, the direction keypad portions may be formed on the body for direction control. Therefore, the number of the components of the navigation keypad and the assembling hour of the navigation keypad can be reduced. Besides, since the body itself can provide as a support, additional support base is not necessary. In addition, the inclined plane of the elastic post allows the direction keypad portion to be closely in contact with the directional elastic post via the lever principle. Therefore, when one of the direction keypad portions is pressed, other direction keypad portion would not be affected or mispressed.

Furthermore, during assembling, each of the direction keypad portions is lean against the corresponding elastic post by a reload force. When each of the direction keypad portions is lean against the corresponding directional elastic post by a reload force, the axis deflection of the directional elastic posts can be prevented due to the direction keypad portions are pre-pressed on the directional elastic post, respectively, such that the positioning precision between the direction keypad portions and the directional elastic posts can be further improved. In other words, if the direction keypad portion does not pre-press on the directional elastic post, the directional elastic post may be axis deflected when the direction keypad portion is pressed by a user since each direction keypad portion and the corresponding directional elastic post are mated with and in contact with each other by the inclined plane and the jointing plane. In addition, when the direction keypad portions are forced to further press the directional elastic posts, the noise and the shaking induced by the pressing can be reduced by the reload forces provided from the direction keypad portions, and the body can be prevented from being shifted.

Because of the cavity which makes the connecting member to have different thickness, the center keypad portion can be restored resiliently. That is, when the center keypad portion is pressed downward by a pressing force, the connecting member is deformed and an elastic recover force is generated in the connecting member. When the pressing force is removed, the center keypad portion can be restored resiliently by the elastic recover force, and the connecting member can be recovered to the original position (the position without the pressing force).

Detailed description of the characteristics and the advantages of the disclosure is shown in the following embodiments. The technical content and the implementation of the disclosure should be readily apparent to any person skilled in the art from the detailed description, and the purposes and the advantages of the disclosure should be readily understood by any person skilled in the art with reference to content, claims and drawings in the disclosure.

BRIEF DESCRIPTION OF THE DRAWINGS

The instant disclosure will become more fully understood from the detailed description given herein below for illustration only, and thus not limitative of the instant disclosure, wherein.

DETAILED DESCRIPTION

Figure 2:
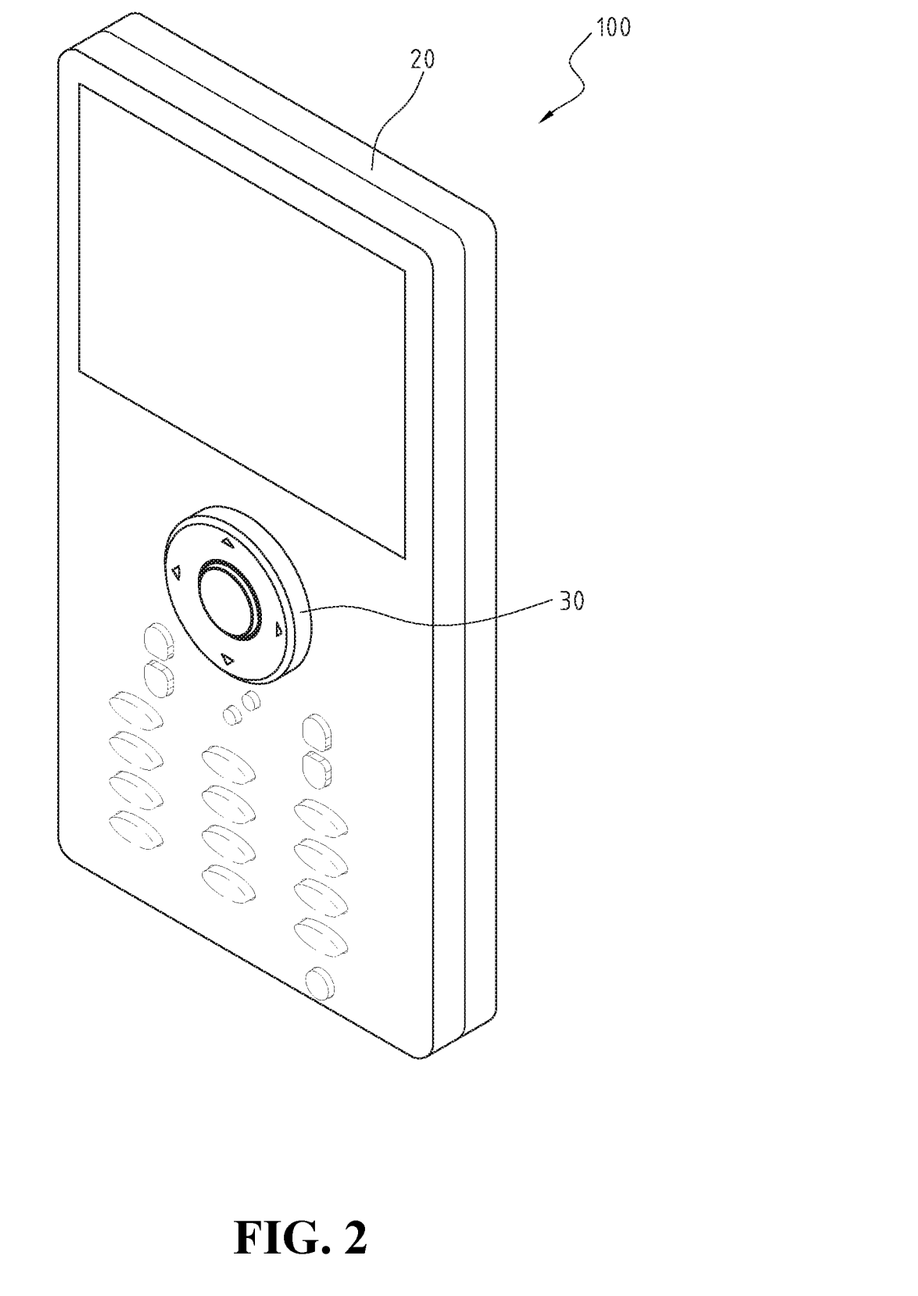
FIG. 2 is a perspective view of an electronic device having a navigation keypad according to an exemplary embodiment of the instant disclosure.
Figure 3:
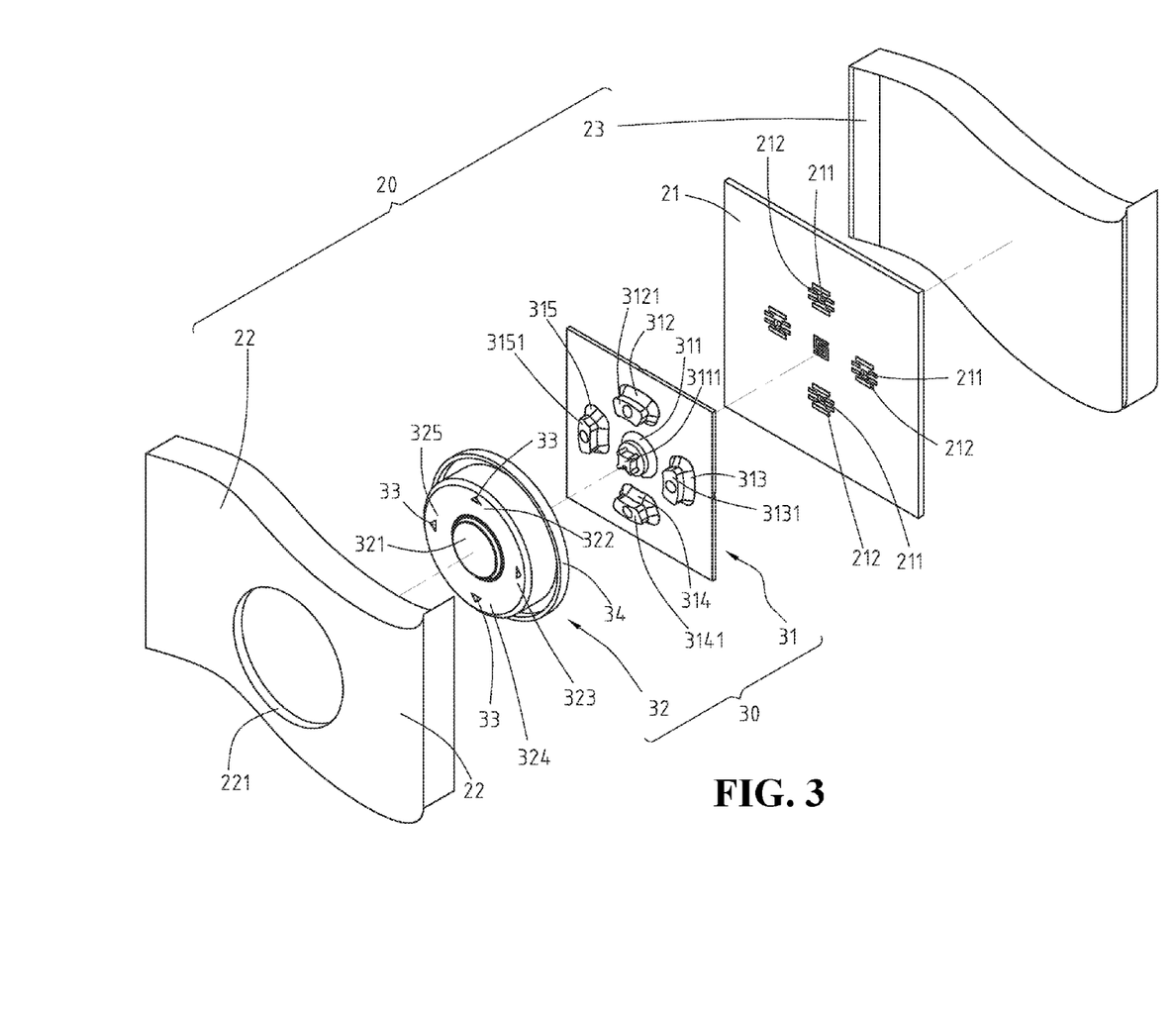
FIG. 3 is a partial front exploded view of the electronic device of FIG. 2.
Figure 4:
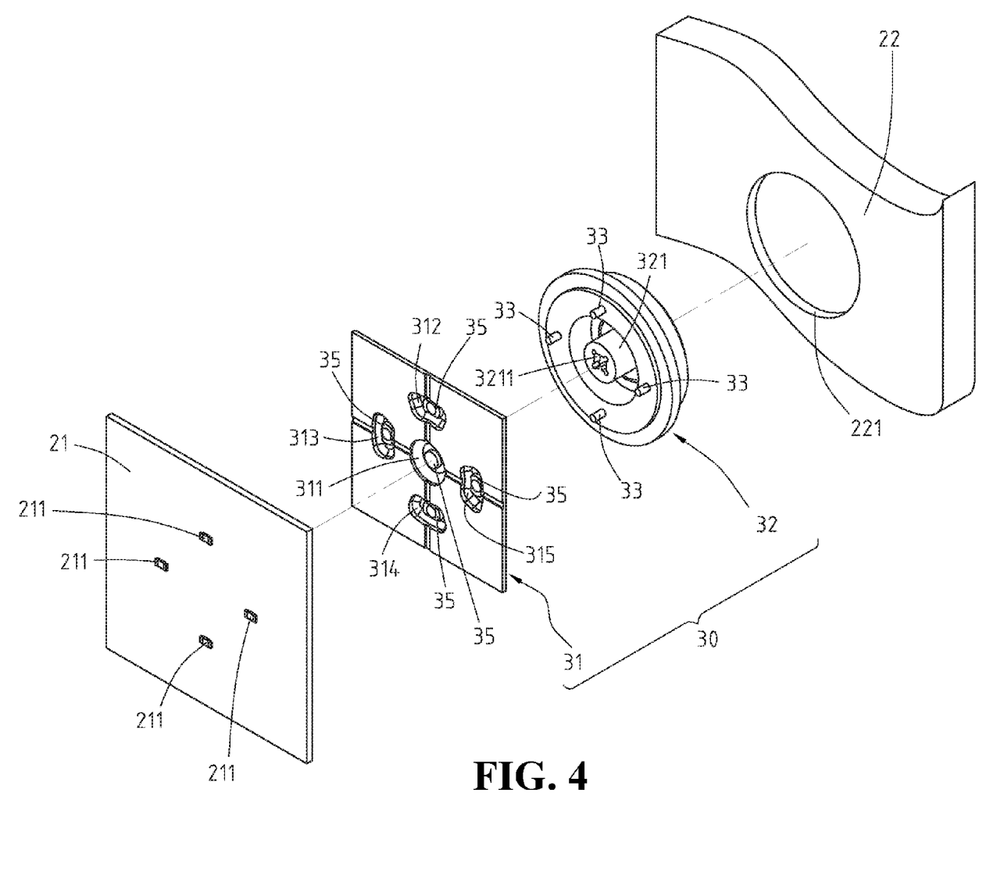
FIG. 4 is a partial rear exploded view of the electronic device of FIG. 2.
Figure 5:
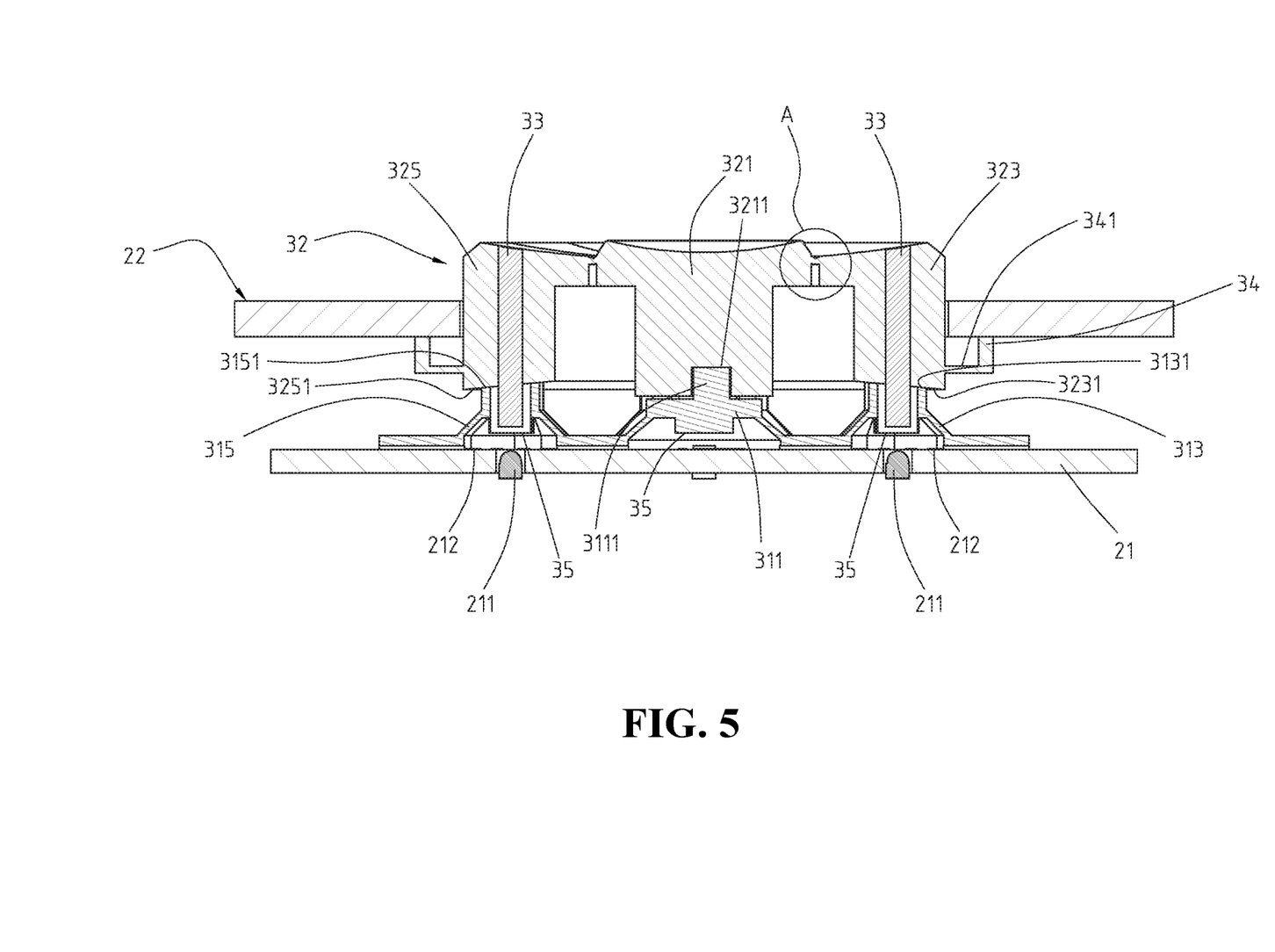
FIG. 5 is a partial sectional view (1) of the electronic device of FIG. 2.
Figure 6:
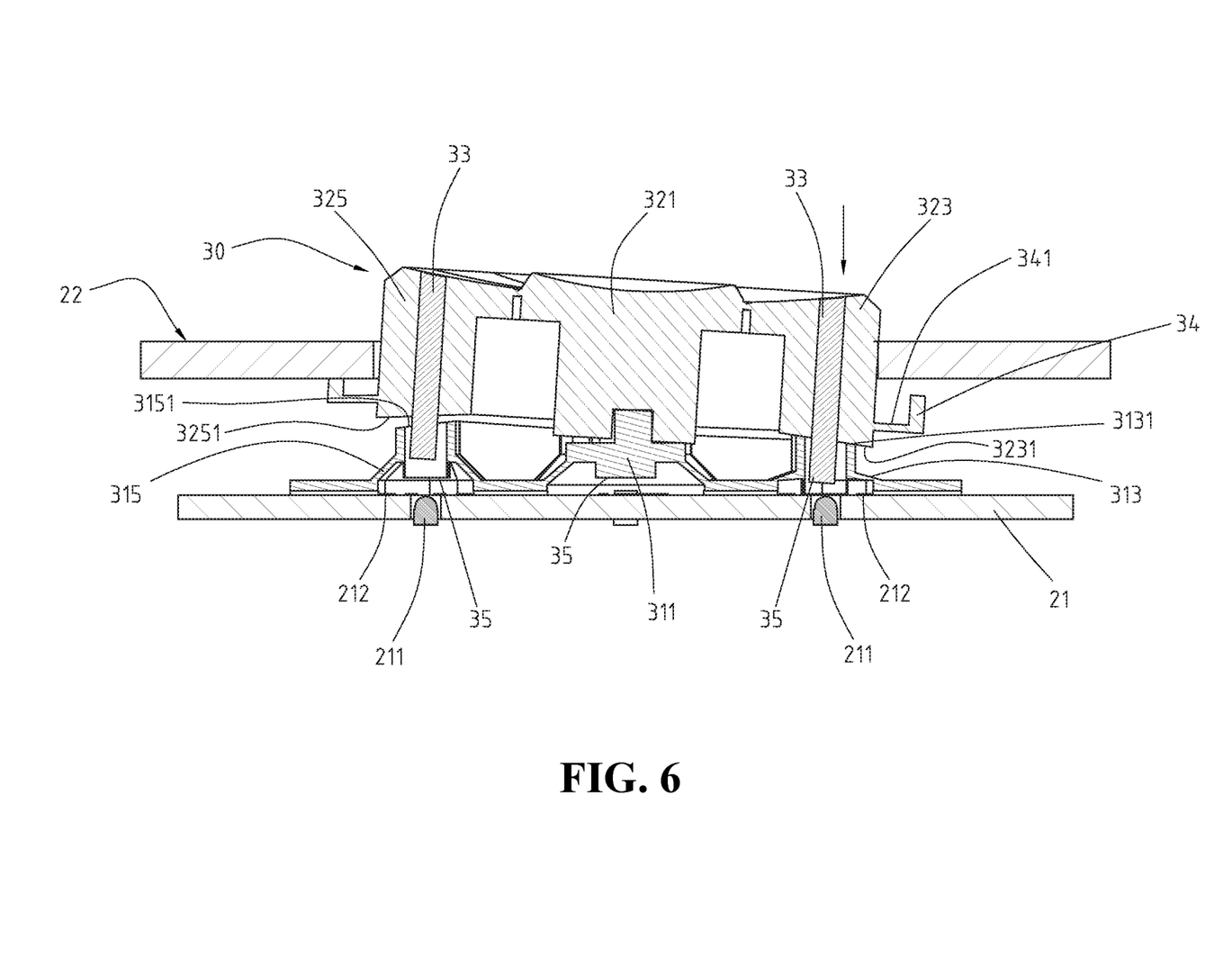
FIG. 6 is a partial sectional view (2) of the electronic device of FIG. 2 in which the electronic device is in operation.
Figure 7:
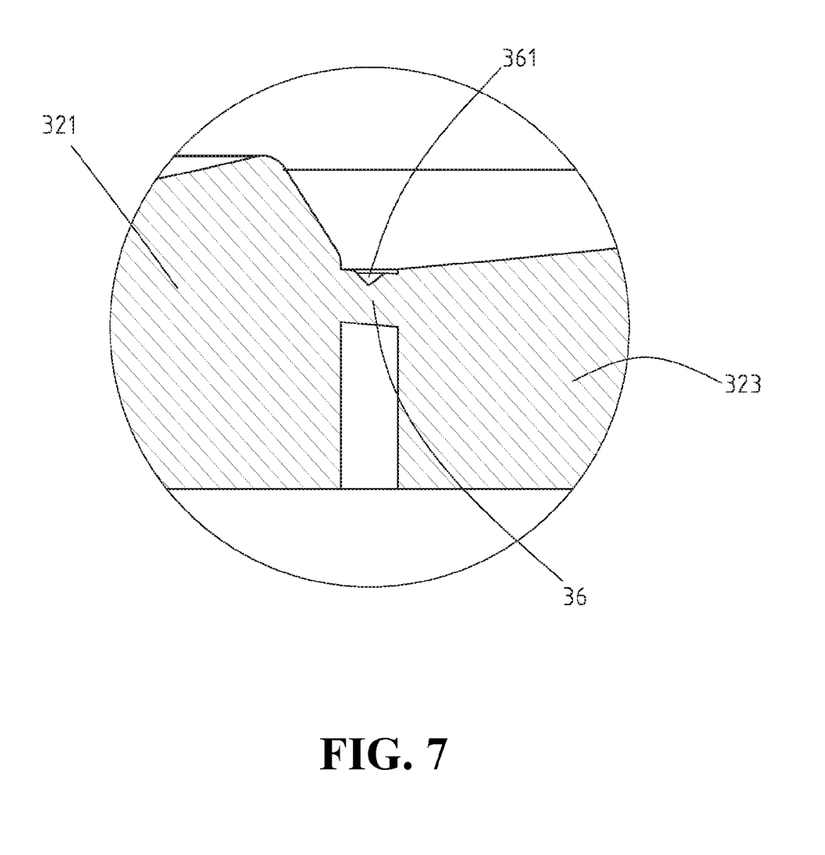
FIG. 7 is a partial enlarged view of the portion A shown in FIG. 5.

Please refer to FIGS. 2 to 7, illustrating an electronic device 100 having a navigation keypad 30 according to an exemplary embodiment of the instant disclosure. FIG. 2 is a perspective view of the electronic device 100. FIG. 3 is a partial front exploded view of the electronic device 100 of FIG. 2. FIG. 4 is a partial rear exploded view of the electronic device 100 of FIG. 2. FIG. 5 is a partial sectional view (1) of the electronic device 100 of FIG. 2. FIG. 6 is a partial sectional view (2) of the electronic device 100 of FIG. 2, where the electronic device 100 is in operation. FIG. 7 is a partial enlarged view of the portion A shown in FIG. 5. In this embodiment, the electronic device 100 comprises a case 20, a keypad printed circuit board 21, and a navigation keypad 30 disposed in the electronic device 100. The case 20 may comprise a front cover 22 and a rear cover 23. The keypad printed circuit board 21 is received in a receiving space defined between the front cover 22 and the rear cover 23, and a plurality of control contacts 212 may be disposed on the keypad printed circuit board 21. The navigation keypad 30 is protruded from the front cover 22 and exposed to the outside of the case 20 so as to be manipulated.

The navigation keypad 30 comprises an elastic support element 31 and a body 32. As shown in FIG. 3 and FIG. 4, the elastic support element 31 is received in the receiving space of the case 20 and disposed on the keypad printed circuit board 21. In this embodiment, the elastic support element 31 comprises a center elastic post 311 and four directional elastic posts 312, 313, 314, 315 around the center elastic post 311. Here, the number of the directional elastic post is for illustrative purposes. In this embodiment, the navigation keypad 30 is provided for four-direction controlling, i.e., up, down, left, and right directions; therefore four directional elastic posts are provided. In some embodiments, the navigation keypad 30 may be provided for one or more direction controlling, and the number of the directional elastic post can be adjusted accordingly. In addition, in some embodiments, the navigation keypad 30 may be devoid of the center elastic post, based on user requirement.

Please refer to FIGS. 3-5. Each of the directional elastic posts 312, 313, 314, 315 has a first end and a second end. The first end is distant from the keypad printed circuit board 21 while the second end is near the keypad printed circuit board 21, each of the first ends has an inclined plane 3121, 3131, 3141, 3151, and a conductive layer 35 is coated on the second ends. Here, the conductive layer 35 is a carbon conductive layer; alternatively, the conductive layer 35 may be a layer made by any electrical conductive materials and coated on the second ends of the directional elastic posts 312, 313, 314, 315, respectively.

The body 32 is passing through the case 20 of the electronic device 100 and positioned corresponding to the elastic support element 31. In this embodiment, a through hole 221 is defined on the front cover 22 of the case 20, and the body 32 is passing through the through hole 221 to be exposed to the outside of the front cover 22 of the case 20. In this embodiment, the body 32 is approximately cylinder shaped, and the body 32 comprises a center keypad portion 321 and four direction keypad portions 322, 323, 324, 325, i.e., the areas surrounding the triangles shown in FIG. 3. The four direction keypad portions 322, 323, 324, 325 may be disposed around the center keypad portion 321 equiangularly, e.g., 90 degrees. Here, the shape of the body 32 is provided for illustrative purpose, embodiments are not limited thereto. The body 32 may be of, for example, rectangular shape or polygonal shape. Besides, the number of the direction keypad portion is for illustrative purposes. In this embodiment, the navigation keypad 30 is provided for four-direction controlling, i.e., up, down, left, and right directions, therefore four direction keypad portions are provided. In some embodiments, the navigation keypad 30 may be provided for one or more direction controlling, and the number of the direction keypad portions can be adjusted accordingly. In addition, in some embodiments, the navigation keypad 30 may be devoid of the center keypad portion.

Please refer to FIGS. 3-5. Each of the direction keypad portions 322, 323, 324, 325 is lean against the corresponding directional elastic post 312, 313, 314, 315, i.e., the direction keypad portion 322 is lean against the directional elastic post 312, the direction keypad portion 323 is lean against the directional elastic post 313, the direction keypad portion 324 is lean against the directional elastic post 314, and the direction keypad portion 325 is lean against the directional elastic post 315. A surface of each of the direction keypad portions 322, 323, 324, 325 is lean against the corresponding directional elastic post 312, 313, 314, 315, and the surface has a jointing plane. Each of the jointing planes is corresponding to an inclined angle of the corresponding inclined plane 3121, 3131, 3141, 3151. As shown in FIG. 5, for the sake of clarity, jointing planes 3231, 3251 corresponding to the inclined planes 3131, 3151 are illustrated for exemplary purpose. When the navigation keypad 30 is assembled to the electronic device 100, each of the inclined planes 3121, 3131, 3141, 3151 is closely in contact with the corresponding jointing plane.

During assembling, each of the direction keypad portions 322, 323, 324, 325 is lean against the corresponding elastic post 312, 313, 314, 315 by a reload force. When each of the direction keypad portions 322, 323, 324, 325 is lean against the corresponding directional elastic post 312, 313, 314, 315 by a reload force, the axis deflection of the directional elastic posts 312, 313, 314, 315 can be prevented due to the direction keypad portions 322, 323, 324, 325 are pre-pressed on the directional elastic posts 312, 313, 314, 315, respectively, such that the positioning precision between the direction keypad portions 322, 323, 324, 325 and the directional elastic posts 312, 313, 314, 315 can be further improved. In other words, if the direction keypad portion 322, 323, 324, 325 does not pre-press on the directional elastic post 312, 313, 314, 315, the directional elastic post 312, 313, 314, 315 may be axis deflected when the direction keypad portion 322, 323, 324, 325 is pressed by a user since each direction keypad portion 322, 323, 324, 325 and the corresponding directional elastic post 312, 313, 314, 315 are mated with and in contact with each other by the inclined plane 3121, 3131, 3141, 3151 and the jointing plane. In addition, when the direction keypad portions 322, 323, 324, 325 are forced to further press the directional elastic posts 312, 313, 314, 315, the noise and the shaking induced by the pressing can be reduced by the reload forces provided from the direction keypad portions 322, 323, 324, 325, and the body 32 can be prevented from being shifted.

Please refer to FIGS. 3-6, when the user presses the direction keypad portion 323, the direction keypad portion 323 is moved downward to press on the directional elastic post 313 until the conductive layer 35 of the directional elastic post 313 is in contact with the control contact 212 of the keypad printed circuit board 21 so as to allow the conduction of the control circuit to complete the operation demand. When the direction keypad portion 323 is pressed, the inclined plane 3131 may be provided to further enhance the lever principle of the navigation keypad 30. Specifically, when the direction keypad portion 323 is pressed, the jointing plane 3231 is in contact with the inclined plane 3131 to allow the jointing plane 3251 of the direction keypad portion 325 to slightly detach from the inclined plane 3151 of the directional elastic post 315. Therefore, when one direction keypad portion is pressed, other direction keypad portions would not be affected or mispressed.

In addition, a waterproof member 34 may be disposed to the periphery of the body 32, and the waterproof member 34 is disposed around the body 32. A waterproof recess 341 is defined between the waterproof member 34 and the direction keypad portions 322, 323, 324, 325. As shown in FIG. 5, when the navigation keypad 30 is assembled to the case 20, the waterproof member 34 is lean against the front cover 22. When a small amount of water is entering into the case 20 through the through hole 221 of the front cover 22, instead of entering into the interior of the case 20 and causing the keypad printed circuit board 21 in a short circuit condition, the water would be blocked by the waterproof member 34 and collected in the waterproof recess 341.

Moreover, four LEDs 211 may be disposed on the keypad printed circuit board 21, and each of the LEDs 211 is correspond to the corresponding directional elastic post 312, 313, 314, 315. The body 32 may comprise four light guiding posts 33, and each of the light guiding posts 33 is passing through the corresponding direction keypad portion 322, 323, 324, 325 and received in the corresponding directional elastic post 312, 313, 314, 315. In this embodiment, the body 32 is made of opaque material, while the light guiding posts 33 are made of light-permitting material. In some embodiments, the body 32 could be made of translucent material. The body 32 and the light guiding posts 33 may be integrally formed as a whole by any viable means, such that the manufacturing time and the assembling hour of the navigation keypad 30 can be reduced. Please refer to FIGS. 4-5, taking the direction keypad portion 323 as an example, the light guiding post 33 is passing through the direction keypad portion 323 and received in the directional elastic post 313 which is hollowed. When the LED 211 emits light, the light would pass through the directional elastic post 313 and is emitted out of the body 32 through the light guiding post 33.

No matter the body 32 is made of the opaque material or translucent material, the light could pass through the light guiding posts 33. In some embodiments, the surface of the light guiding post 33 may be aligned with the jointing plane 3231 of the direction keypad portion 323 rather than protruded from the direction keypad portion 323. Accordingly, the light passing through the directional elastic post 313 would be emitted out of the body 32 through the light guiding post 33. Besides, for providing an indicating function, the shape of the sectional area of the light guiding post 33 may be a triangle, and the triangle is formed on the surface of the direction keypad portion 313. Therefore, when the user uses the electronic device 100 having the navigation keypad 30 in an indoor area which is darker, the LEDs 211 can emit light, such that the user can recognize the direction to be controlled for each of the direction keypad portions 322, 323, 324, 325.

Please refer to FIGS. 4-5, the center elastic post 311 comprises a positioning block 3111, the center keypad portion 321 defines a positioning groove 3211, and the positioning block 3111 is received in the positioning groove 3211. Based on this, during assembling the body 32 to the elastic support element 31, the positioning groove 3211 of the center keypad portion 321 is coaxially fitted over the positioning block 3111 of the center elastic post 311, such that the body 32 can be positioned to the center elastic post 311. In addition, the positioning block 3111 may be of irregular shape, and the shape of the positioning groove 3211 is designated to be mated with the positioning block 3111, such that the matching between the positioning block 3111 and the positioning groove 3211 provides a positioning and foolproof function. Hence, the body 32 can be assembled to the elastic support element 31 quickly, and the installation orientation of the body 32 and the elastic support element 31 can be ensured by utilizing the mating between the positioning block 3111 and the positioning groove 3211.

Please refer to FIGS. 5-6. The center keypad portion 321 and the direction keypad portions 322, 323, 324, 325 are connected with each other through a connecting member 36, and the connecting member 36 defines a cavity 361. In this embodiment, as shown in FIG. 7, the cross section of the cavity 361 is of V shape. Because of the cavity 361 which makes the connecting member 36 have different thickness, the center keypad portion 321 can be restored resiliently. That is, when the center keypad portion 321 is pressed downward by a pressing force, the connecting member 36 is deformed and an elastic recover force is generated in the connecting member 36. When the pressing force is removed, the center keypad portion 321 can be restored resiliently by the elastic recover force, and the connecting member 36 can be recovered to the original position (the position without the pressing force).

Moreover, the center keypad portion 321, the connecting member 36, and the direction keypad portions 322, 323, 324, 325 may be formed integrally as a whole. Besides, in order to allow the connecting member 36 to be elastic and flexible, the center keypad portion 321, the connecting member 36, and the direction keypad portions 322, 323, 324, 325 may be made of rubber or plastic.

Figure 8:
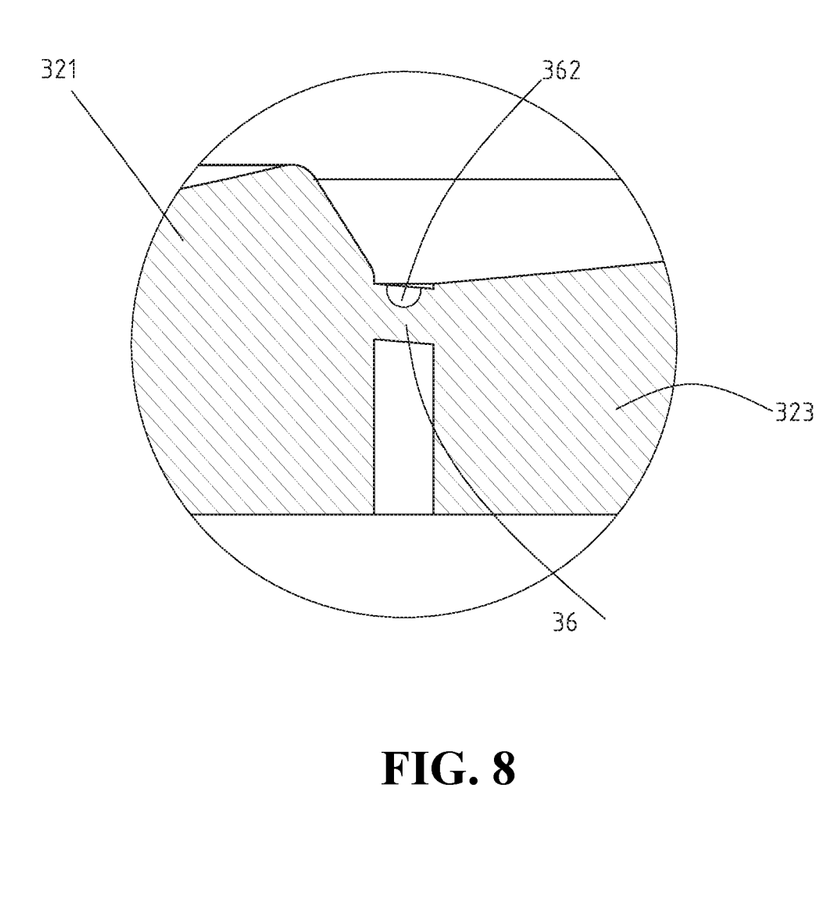
FIG. 8 is a partial enlarged view of a body of an electronic device having a navigation keypad according to another embodiment of the instant disclosure.

FIG. 8 illustrates a partial enlarged view of a body 32 of an electronic device 100 having a navigation keypad 30 according to another embodiment of the instant disclosure. In this embodiment, the cross section of the cavity 362 is of U shape. Similar to the forgoing embodiment, the center keypad portion 321 can be restored resiliently because of the cavity 362 which makes the connecting member 36 to have different thickness.

While the disclosure has been described by way of examples and in terms of preferred embodiments, it is to be understood that the invention is not limited to the disclosed embodiments. On the contrary, the intent is to cover various modifications and similar arrangements, which are within the spirit and scope of the appended claims, the scope of which should be accorded the broadest interpretation so as to encompass all such modifications and similar structures.

What is claimed is:

1. A navigation keypad, adapted to an electronic device, the electronic device comprising a case and a keypad printed circuit board disposed in the case, the navigation keypad comprising:

an elastic support element received in the case and disposed on the keypad printed circuit board, wherein the elastic support element comprises a first elastic post, a second elastic post, and a center elastic post located therebetween, the first elastic post having a first end and a second end, the first end being distant from the keypad printed circuit board, wherein the first end has an inclined planar surface inclined outwardly from the center elastic post and downwardly toward the keypad printed circuit board, the second elastic post having a third end and a fourth end, the third end being distant from the keypad printed circuit board, wherein the third end has an inclined planar surface inclined outwardly from the center elastic post and downwardly toward the keypad printed circuit board; and a body passing through the case of the electronic device and positioned to correspond to the elastic support element, wherein the body comprises a first direction keypad portion corresponding to the first elastic post, a second direction keypad portion corresponding to the second elastic post, and a center keypad portion corresponding to the center elastic post, wherein the first direction keypad portion has a first jointing planar surface inclined at an angle corresponding to the inclined planar surface of the first end, and the second direction keypad portion has a second jointing planar surface inclined at an angle corresponding to the inclined planar surface of the third end;

wherein, in an unpressed state, the first jointing planar surface and the inclined planar surface of the first end contact each other, and the second jointing planar surface and the inclined planar surface of the third end contact each other;

wherein, in a pressed state, in which the first direction keypad portion is pressed, the first jointing planar surface and the inclined planar surface of the first end remain in contact as the elastic support element deforms, and the second jointing planar surface and the inclined planar surface of the third end disengage each other as the body pivots about the center elastic post.

2. The navigation keypad according to claim 1, wherein the second end of the first elastic post is near the keypad printed circuit board, and a conductive layer is coated on the second end.

3. The navigation keypad according to claim 1
wherein the elastic support element comprises four elastic posts, including the first elastic post, the second elastic post, a third elastic post, and a fourth elastic post; and
wherein the body comprises four direction keypad portions, including the first direction keypad portion, the second direction keypad portion, a third direction keypad portion, and a fourth direction keypad portion.

4. The navigation keypad according to claim 3, wherein the body is cylinder shaped.

5. The navigation keypad according to claim 3, wherein a waterproof member is disposed about the periphery of the body.

6. The navigation keypad according to claim 3, wherein the body is made of opaque material or translucent material.

7. The navigation keypad according to claim 3, wherein the body further comprises four light guiding posts, each of the light guiding posts extending through a corresponding one of the direction keypad portions and being received in a corresponding one of the elastic posts.

8. The navigation keypad according to claim 7, wherein each of the light guiding posts and the corresponding direction keypad portions are integrally formed.

9. The navigation keypad according to claim 1,
wherein the center keypad portion and the direction keypad portions are connected with each other through a connecting member, and the connecting member defines a cavity.

10. The navigation keypad according to claim 9, wherein a cross section of the cavity is V-shaped.

11. The navigation keypad according to claim 9, wherein a cross section of the cavity is U-shaped.

12. The navigation keypad according to claim 9, wherein the center elastic post comprises a positioning block, the center keypad portion comprises a positioning groove, and the positioning block is received in the positioning groove.

13. The navigation keypad according to claim 9, wherein the center keypad portion, the connecting member, and the direction keypad portions are integrally formed.

14. The navigation keypad according to claim 3, wherein each of the direction keypad portions is disposed in a corresponding quadrant about the center keypad portion.

* * * * *